United States Patent
Suma

(10) Patent No.: US 8,556,493 B2
(45) Date of Patent: Oct. 15, 2013

(54) SPREAD ILLUMINATING APPARATUS

(75) Inventor: Akiko Suma, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 13/547,721

(22) Filed: Jul. 12, 2012

(65) Prior Publication Data
US 2013/0027972 A1 Jan. 31, 2013

(30) Foreign Application Priority Data

Jul. 25, 2011 (JP) .................................. 2011-162194

(51) Int. Cl.
*F21V 7/04* (2006.01)

(52) U.S. Cl.
USPC ............................ 362/621; 362/600; 362/634

(58) Field of Classification Search
USPC ........................... 362/600–634, 237, 242, 244
See application file for complete search history.

(56) References Cited

U.S. PATENT DOCUMENTS

| 2007/0159848 A1* | 7/2007 | Yang et al. | 362/608 |
| 2007/0274100 A1* | 11/2007 | Yang et al. | 362/615 |
| 2009/0015753 A1* | 1/2009 | Ye | 349/64 |

FOREIGN PATENT DOCUMENTS

| JP | A-10-293202 | 11/1998 |
| JP | A-2008-170739 | 7/2008 |

* cited by examiner

*Primary Examiner* — Anne Hines
(74) *Attorney, Agent, or Firm* — Oliff & Berridge, PLC

(57) ABSTRACT

A spread illuminating apparatus includes a point light source; a light guiding plate having a light incident face on which the point light source is mounted, and a light output face. The light incident face has light incident prisms diffusing light emitted from the point light source into a planar space substantially parallel with the light output face. The light incident prisms include: a first prism portion including a plurality of first prisms convex relative to the light incident face; and a second prism portion including a second prism convex relative to the light incident face, the second prism portion being placed next to the first prism portion in a longitudinal direction of the light incident face. The first prism partially overlaps another first prism adjacent thereto, and the vertex of each first prism is set higher than the vertex of the second prism relative to the light incident face.

6 Claims, 3 Drawing Sheets

SPREAD ILLUMINATING APPARATUS

BACKGROUND OF THE INVENTION

1. Field of the Invention

The present invention relates to a spread illuminating apparatus, and more particularly to a sidelight-type spread illuminating apparatus including a light guiding plate with a light source provided on a light incident face of the light guiding plate. In the spread illuminating apparatus, planar illumination light is adapted to exit out from a light output portion of the light guiding plate.

2. Description of Related Art

In a lighting device provided with a liquid crystal display panel, a sidelight-type spread illuminating apparatus (backlight) having compact, environmentally-compatible LEDs, the LEDs being arranged along the light incident face of a light guiding plate, has been widely applied. This type of spread illuminating apparatus has particularly been used in the field of compact portable information devices such as mobile phones. It is known that, in such a spread illuminating apparatus, uneven brightness derived from a bright area in front of each LED and a dark area between adjacent LEDs occurs in the vicinity of the light incident face of the light guiding plate. Conventionally, in order to solve such uneven brightness, there has been proposed a spread illuminating apparatus, in which a light incident prism for diffusing light is formed on the light incident face of the light guiding plate (for example, see Japanese Patent Application Laid-Open No. 10-293202).

Since recent information devices have become much thinner, a strong demand to make a spread illuminating apparatus thinner also increases. To accomplish the above demand, for example, the following spread illuminating apparatus has been proposed. That is, an inclined surface is provided near the light incident face of a light guiding plate as that the thickness of the light guiding plate gradually reduces from the light incident face toward a light output face. With this structure, the thickness of the light incident face of the light guiding plate corresponds to the light output face of each LED. On the other hand, the light output face portion of the light guiding plate is allowed to be further thinner (see, for example, JP-A No. 2008-170739).

According to studies that have been conducted by the inventors, etc., it has been known that, in these thin-type spread illuminating apparatuses, considering uneven brightness produced near the light incident face thereof, not only bright and dark patterns are just produced, but these patterns are changed depending on how to observe the light output face of the light guiding plate. Such changes in the bright and dark patterns typically occur in a following condition. When a viewer observes the light output face in a substantially vertical direction relative to the light output face of the light guiding plate, an area in front of each LED appears bright and an area between the adjacent LEDs appears dark. On the other hand, when a viewer observes the light output face in a nearly horizontal direction relative to the light output face of the light guiding plate, the bright patterns and the dark patterns are reversed to each other (hereinafter referred to as the "reversal phenomenon").

Such a reversal phenomenon significantly impairs visibility of an object to be illuminated (for example, a liquid crystal display device), and thus it is very important to inhibit the reversal phenomenon to improve the quality of a spread illuminating apparatus. The reversal phenomenon is caused due to the difference of brightness angular distributions. Specifically, light to be guided in front of the LEDs (that is, near the light incident face of the light guiding plate) mainly contributes to the brightness in an area which faces the LED. On the other hand, light to be obliquely guided from both adjacent LEDs mainly contributes to the brightness in an area between the adjacent LEDs. According to studies by the inventors, etc., it has been found that a conventional light incident prism as described, for example, in JP-A No. 10-293202 fails to sufficiently inhibit this reversal phenomenon.

Furthermore, through their researches, it has been found that the reversal phenomenon becomes effectively inhibitable by providing a group of prisms, which include a plurality of prisms on the light output face of the light guiding plate, the prisms extending substantially vertically with respect to the light incident face. However, particularly in a case of JP-A No. 2008-170739 where a thin-type spread illuminating apparatus has an inclined face in the vicinity of the light incident face, there is a problem that leaked light occurs with a great amount at a boundary between the inclined face and the light output face due to the group of prisms. It thus becomes difficult to apply the above group of prisms as common devices for inhibiting the reversal phenomenon.

SUMMARY OF THE INVENTION

The present invention has been made in light of the above problems, and it is an object of the present invention to provide a spread illuminating apparatus, which is excellent in even brightness near the light incident face of the light guiding plate, and also suitable for a thin configuration.

Embodiments hereinbelow exemplify some structural features derived from the present invention, and are itemized for facilitating understanding of various structures of the present invention. Each item does not intend to limit the technical scope of the present invention. While considering the best modes to carry out the present invention, even if components of each item is partially substituted or deleted, or even if another component is added thereto, these should be regarded as the elements of the technical scope of the present invention.

In order to achieve the object described above, according to a first aspect of the present invention, there is provided a spread illuminating apparatus comprising: a point light source; a light guiding plate having a light incident face on which the point light source is mounted, and a light output face for planarly outputting light that has been introduced from the light incident face, the light incident face having light incident prism thereon so as to diffuse light that has been emitted from the point light source into a planar space substantially parallel with the light output face, wherein the light incident prism include: a first prism portion including a plurality of first prisms convex relative to the light incident face; and a second prism portion including a second prism convex relative to the light incident face, the second prism portion being placed next to the first prism portion in a longitudinal direction of the light incident face, the first prism partially overlaps another first prism adjacent thereto, and the vertex of each first prism is set higher than the vertex of the second prism relative to the light incident face.

In the above structure, light is firstly emitted from a point light source, and introduced into one face of the first prism. The light obliquely directs without being reflected at the other face of the first prism. The above structure is allowed to increase the ratio of the obliquely directed light. Thus, illumination evenness near the light incident face of the light guiding plate will be improved. Here, in the spread illuminating apparatus according to the first aspect of the present invention, since the ratio of the obliquely directed light increases, it is possible to even out a brightness angle distribution between 1) an area in front of a point light source (for example, an area A in FIG. 4) and 2) an area between each of the point light sources (for example, areas B and C in FIG. 4). Accordingly, the brightness reversal phenomenon produced near the light incident face will become inhibitable in a quite effective manner.

Further, in the above structure, with no need to have prisms, etc. on its light output face, it is possible to reduce the reversal phenomenon generated near the light incident face, resulting in improvement of illumination evenness. Accordingly, in a thin-type spread illuminating apparatus where an inclined face is provided near the light incident face of a light guiding plate, light leakage near an area defined between the inclined face and the light output face can be effectively reduced. The above structure will be thus particularly advantageous if applied to such a thin-type spread illuminating apparatus.

In the first aspect of the present invention, the spread illuminating apparatus further comprises a root formed by which each adjacent first prism overlaps to each other, the root being adapted to have a position higher than the vertex of the second prism relative to the light incident face With this structure, a ratio of light that has been introduced into one face of the first prism and obliquely directs without being reflected at the other face of the first prism will increase. It is thus possible to further even out a brightness angle distribution between 1) an area in front of a point light source (for example, an area A in FIG. 4) and 2) an area between each of the point light sources (for example, areas B and C in FIG. 4).

In the first aspect of the present invention, the first and second prism portions are repeatedly formable along the longitudinal direction of the light incident face.

In the first aspect of the present invention, the first and second prisms are configurable to have a cross section constant in the thickness direction of the light guiding plate.

In the first aspect of the present invention, the first and the second prisms are each configurable to have a triangular cross section.

In the first aspect of the present invention, the first and the second prisms are all configurable to have the same vertical angles.

Each of the above present embodiments is allowed to provide a spread illuminating apparatus excellent in even brightness near the light incident face of the light guiding plate. The above embodiments are also suitable for thickness reduction of the apparatus.

BRIEF DESCRIPTION OF THE DRAWINGS

FIG. 3A is the light incident prism of the present invention, and FIG. 3B is a conventional light incident prism.

DETAILED DESCRIPTION OF THE PREFERRED EMBODIMENTS

Figure 1:
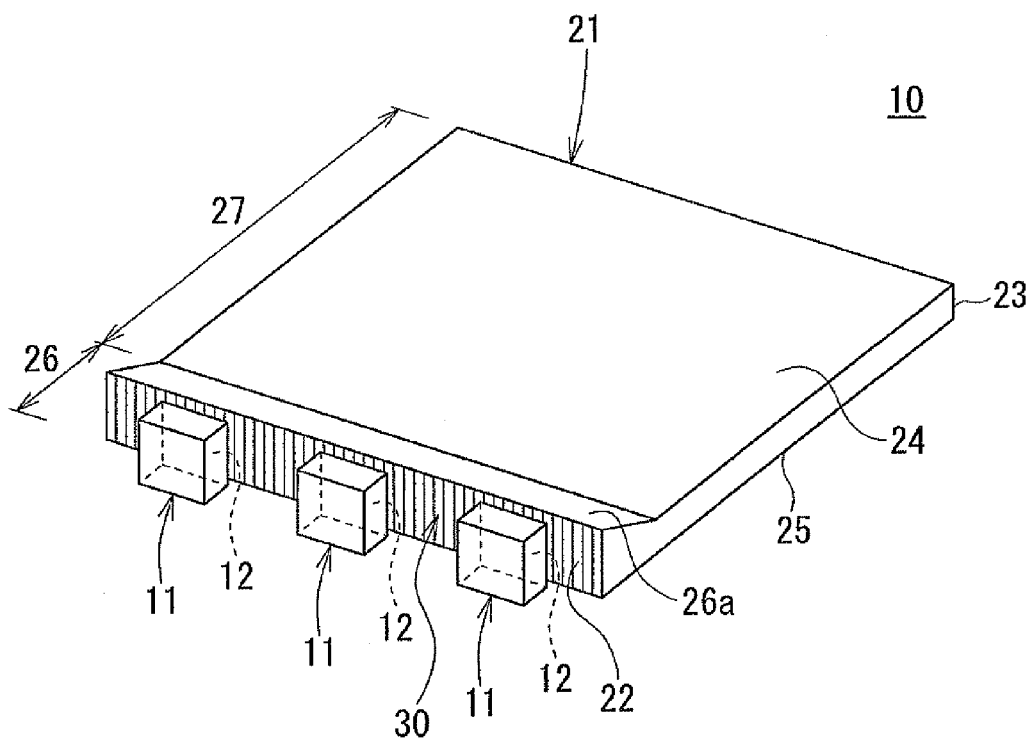
FIG. 1 is a perspective view illustrating the main portion of a spread illuminating apparatus according to one embodiment of the present invention.

Hereinafter, embodiments of the present invention will be explained with reference to the accompanying drawings. FIG. 1 is a perspective view illustrating the main portion of a spread illuminating apparatus 10 of one embodiment of the present invention. The spread illuminating apparatus 10 includes: a plurality of LEDs 11 (three LEDs in the illustrated example) as point light sources; and a light guiding plate 21 for planarly exiting out light that has been emitted from the LEDs 11. The LEDs 11 are typically pseudo white color LEDs. The light guiding plate 21 is made of a transparent material (for example, polycarbonate resin) and formed into a substantially rectangular shape in a top view. One side end face of the light guiding plate 21 is a light incident face 22. The LEDs 11 are arranged along the light incident face 22 such that their light emitting faces 12 direct toward the light incident face 22 of the light guiding plate 21.

Here, a direction moving from the light incident face 22 of the light guiding plate 21 toward a side end face 23, or a direction in which the light emitting face 12 of the LEDs 11 directs is defined as "the front side."

The light guiding plate 21 has a light incident portion 26 formed at the front side of the light incident face 22; and a light output portion 27 continuing from the light incident portion 26, the light output portion 27 exiting out light that has been introduced from the light incident portion 26. The light incident portion 26 has an inclined face 26a with a certain inclination gradually reducing its thickness from the side of the light incident face 22 toward the front side.

The light output portion 27 has a rectangular plate shape with a constant thickness (the same thickness with the one of the most front of the light incident portion 26). The main face continued from the inclined face 26a is defined as a light output face 24 for planarly outputting light that has been introduced from the light incident face 22, and the other main face opposite to the light output face 24 is defined as a reflective face 25. In the spread illuminating apparatus 10, the reflective face 25 may have a light passage conversion pattern formed with a plurality of dots, for example.

The spread illuminating apparatus 10 further has light incident prisms 30 (schematically illustrated in FIG. 1 as a plurality of vertical lines extending in the thickness direction of the light guiding plate 21) on the light incident face 22. Light that has been emitted from the light emitting face 12 of the LEDs 11 enters into the light guiding plate 21 while being diffused into a plane, that is, substantially parallel relative to the light output face 25.

Figure 2:
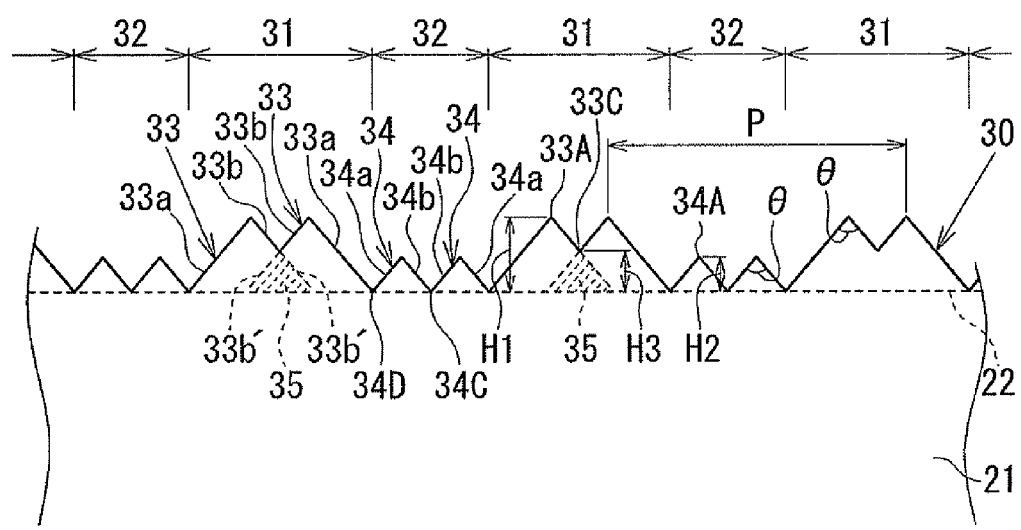
FIG. 2 is an enlarged top view illustrating light incident prisms of the spread illuminating apparatus of FIG. 1.

FIG. 2 is an enlarged top view of the light incident prisms 30. The light incident prisms 30 include: a first prism portion 31 including a plurality of first prisms 33 (two in the illustrated example); and a second prism portion 32 including a plurality of second prisms 34 (two in the illustrated example). The first and second prisms 33 and 34 have convex configuration relative to the light incident face 22.

In the example illustrated in FIG. 2, since the first and second prisms 33 and 34 are arranged with no space, any plane area of the light incident face 22 actually does not exist. An imaginary plane 22 of the light incident plane 22 is thus shown with a dotted line in FIG. 2.

In the light incident prisms 30, each first prism 33 is formed into a triangular pole shape extending in the thickness direction of the light guiding plate 21 (in FIG. 2, the direction perpendicular to the plane of the paper). That is, each first prism 33 has a triangular cross sectional shape defined by a pair of prism faces 33a and 33b, and the cross-sectional shape is constant in the thickness direction of the light guiding plate 21.

The first prism portion 31 includes two first prisms 33 adjacent along the longitudinal direction of the light incident face 22, and is formed as that the two first prisms 33 partially overlap each other. Considering a pair of prism faces 33a and 33b of the first prism 33, a part of the prism face 33b overlapping another adjacent first prism 33 is embedded into the adjacent first prism 33 as an imaginary face 33b', and a triangular-pole-shape overlap portion 35 surrounded by the imaginary faces 33b' and 33b' and having a root 33C where the two prism faces 33b and 33b intersect as a vertex is formed.

The first prism portion 31, when the cross sectional shape thereof is viewed as an integral shape, is composed of a single prism having a concave pentagonal cross section with two vertexes 33A. However, the concave pentagon is viewed as a structure where two triangles overlap each other as described above, and in this sense, the first prism portion 31 is composed of two individual first prisms 33, and each first prism 33 has a triangular cross section partly defined by the imaginary plane 33b' within another adjacent first prism 33.

In the light incident prisms 30, the second prism portion 32 is arranged adjacent to the first prism portion 31 in the longitudinal direction of the light incident face 22. The second prism 34 is formed into a triangular pole shape extending in the thickness direction of the light guiding plate 21. That is, the second prism 34 has a triangular cross sectional shape defined by a pair of prism faces 34a and 34b, and its cross sectional shape is constant in the thickness direction of the light guiding plate 21.

In addition, in the example shown in FIG. 2, each second prism 34 is arranged without any space between the second prism 34 and another adjacent second prism 34 or an adjacent first prism 33, and without overlapping the adjacent second prism 34 or the adjacent first prism 33. Accordingly, a root 34C where the prism face 34b of each second prism 34 and the prism face 34b of another adjacent second prim 34 intersect with each other is positioned on the light incident face 22 and defines a boundary between these second prisms 34. Similarly, a root 34D where the prism face 34a of the second prism 34 and the prism face 33a of the adjacent first prism 33 intersect with each other is positioned on the light incident face 22 and defines a boundary between the first prism 33 and the second prim 34 (accordingly between the first prism portion 31 and the second prism portion 32). Conversely, the light incident face 22 in this example is characterized as an imaginary plane including all the roots 34C and 34D, which are the base ends of the first and second prisms 33 and 34 having a convex shape.

However, in the spread illuminating apparatus 10, the light incident prism 30 may have a space between the second prism 34 and the adjacent first or second prism 33, 34, and may include a plane on the light incident face 22 between the second prism 34 and the adjacent first or second prism 33, 34 as a part of its constituent elements.

Here, in the light incident prism 30, the vertex 33A of the first prisms 33 has a height higher than the vertex 34A of the second prisms 34 relative to the light incident face 22 (H1>H2), and the root (the vertex of the overlap portion 35) 33C is higher than the vertex 34A of the second prisms 34 relative to the light incident face 22 (H3>H2).

In the spread illuminating apparatus 10, when considering each convex height of the light incident prisms 30 relative to the light incident face 22, a higher portion of the light incident prisms 30 is adapted to project more toward the LEDs than a lower portion of the light incident prisms 30.

In addition, in the light incident prism 30, the first prism portion 31 and the second prism portion 32 are repeatedly formed in the longitudinal direction of the light incident face 22. Here, it is preferable that a pitch P between units (one unit is composed of a first prism portion 31 and a second prism portion 32 adjacent to the first prism portion 31) is smaller than at least the width of the light emitting face 12 of a LED 11 (the length along the longitudinal direction of the light incident face 22 in a state where the LED 11 is installed in the spread illuminating apparatus 10), and may be, for example, about 100 µm. The pitch P may be constant across the light incident prisms 30, or may be changed depending on, for example, the positional relation with the LEDs 11, etc.

Further, in the light incident prism 30, all of vertical angles θ of the first and second prisms 33 and 34 are formed with the same angle (for example, 80°). This is advantageous when manufacturing the light guiding plate 21. While mold-processing the light guiding plate 21, a part of the light incident prism 30 can be easily cut with a single bite. Here, the vertical angles θ of the first and second prisms 33 and 34 are suitably designed within a certain range (for example) 60°-120° depending on the optical properties such as diffusing performance. In some cases, however, each vertical angle θ of the first and second prisms 33 and 34 is allowed to be not the same.

Figure 3A:
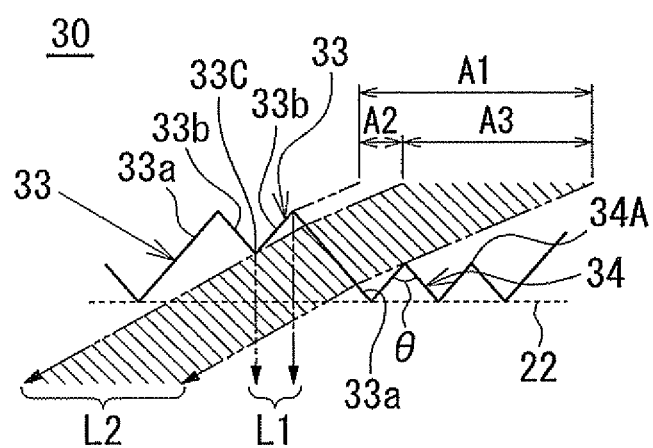
FIGS. 3A and 3B illustrate comparison examples of a light passage of light that has been introduced into the light guiding plate through the prism face of a light incident prism where
Figure 3B:
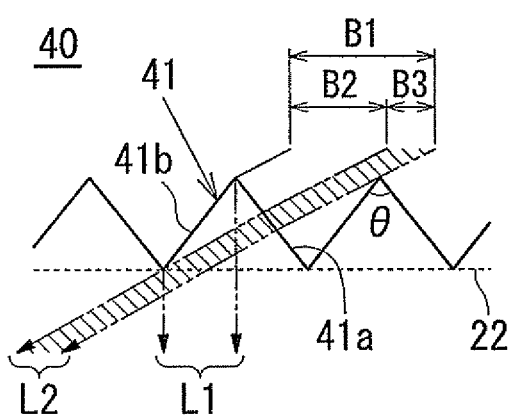
Figure 4:
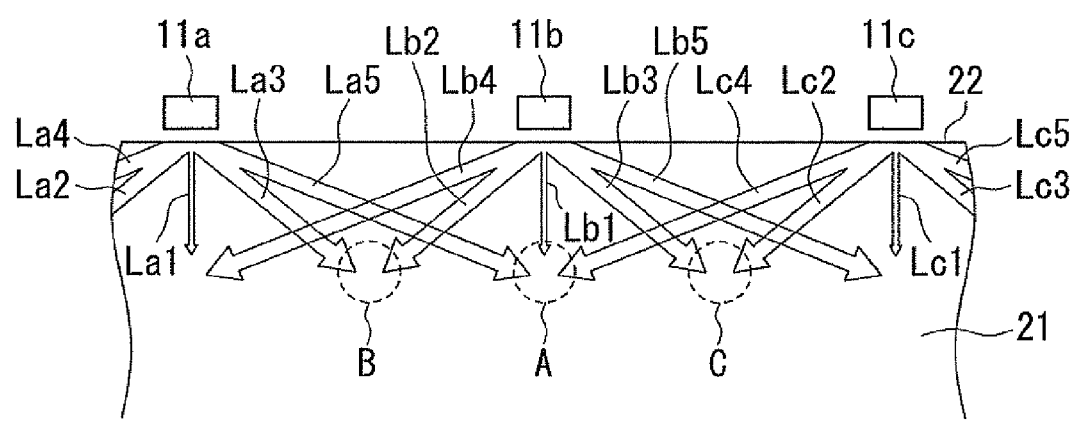
FIG. 4 is a schematic view illustrating a normal light passage of light that has been introduced into the light guiding plate, explaining operational effects of the present invention.

Referring to FIGS. 3A and 3B and 4, the operation and effect of the light incident prisms 30 and the spread illuminating apparatus 10 having the light incident prisms 30 will be explained as follows.

Here, FIG. 3A illustrates an example where a light incident prism 30 according to the present invention is formed on a light incident face 22, and FIG. 313 illustrates an example where a conventional light incident prism 40 is formed on the light incident face 22. The conventional light incident prism 40 is configured in that triangular-pole-shape prisms 41 (which corresponds to the first prisms 33 of the light incident prism 30 in the illustrated example) extend in the thickness direction of the light guiding plate 21 and are aligned along the longitudinal direction of the light incident face 22 without any space or overlap between them, and all the prisms 41 have the same height.

FIGS. 3A and 3B illustrate their respective light passages. Here, among light that has been emitted from the LEDs 11, light with an angle of θ/2 or more relative to the light incident face 22 (θ is the vertical angle of the second prisms 34 and 41) is introduced into the light guiding plate 21 through the prism faces 33a and 41a.

In the light incident prism 30 of the present invention, the first prism 33 is placed adjacent to the second prism 34, the second prism 34 having lower height than the first prism 33 relative to the light incident face 22. With this structure, light to be introduced into the prism face 33a of the first prism 33 increases compared to the case of the prism face 41a of the prism 41 in the conventional prism 40 (A1>B1).

Also, in the light incident prism 30, each first prism 33 is formed by partially overlapping another first prism 33 next thereto. Accordingly, considering light that has been introduced into the prism face 33a, the ratio of light L2 (A3/A1), which advances in an inclined direction without directing toward the front side by the opposite prism face 33b becomes greater than the conventional light incident prism 40. In other word, considering light that has been introduced into the prism face 41, the ratio of light L2 (B3/B1), which advances in an inclined direction without directing toward the front side by the opposite prism face 41b becomes less than the light incident prism 30 of the present invention. Therefore, the relation in (A3/A1)>(B3/B1) can be therefore established.

The above function could achieve its significance since the root 33C placed between the first prisms 33 next to each other is set higher than the vertex 34A of the second prisms 34 relative to the light incident face 22.

Compared to the conventional light incident prism 40, the light incident prism 30 of the present invention will have the following advantage. That is, considering light to be obliquely introduced into the light incident face 22, the ratio of light L1, whose light passage is changed to the front side direction through the light incident prism 30, can reduce. On the other hand, the light incident prism 30 can maintain the ratio of light L2 that has been obliquely introduced into the light guiding plate 21.

As a result, in the spread illuminating apparatus 10 having the light incident prisms 30 on the light incident face 22, as schematically shown in FIG. 4, considering lights that have been emitted from each LEDs 11a, 11b, 11c and have entered into the light guiding plate 21, lights La1, Lb1, Le1 to be guided in the front side direction of the LED will reduce, and lights La2-La5, Lb2-Lb4, Lc2-Lc4 to be guided obliquely relative to the LED will increase.

Accordingly, for example, considering brightness in the front side region A of the LED 11b, contribution of light Lb1 that has been emitted from the LED 11b and guided toward the front of the light guiding plate 21 will reduce, and contribution of lights La5 and Lc4 that have been obliquely guided from the adjacent LEDs 11a and 11c will increase. The same can apply to the front side regions of the LEDs 11a and 11e.

On the other hand, for example, in a region B placed between the LED 11a and the LED 11b, lights La3 and Lb2 that have been obliquely guided from the adjacent LEDs 11a and 11b mainly contribute to brightness in the region B as the same with the conventional method. In a region C placed between the LED 11b and the LED 11c, lights Lb3 and Lc2 that have been obliquely guided from the adjacent LEDs 11b and 11c mainly contribute to brightness in the region C.

Based on the above, brightness uniformity becomes possible near the light incident face 22 of the light guiding plate 21. At the same time, the brightness angle distribution can be uniformized so as to reduce the reversal phenomenon between the front side region of the LED (for example, the front side region A of the LED 11b) and the regions between LEDs (for example, the region B between the LEDs 11a and 11b, and the region C between the LEDs 11b and 11c). As a result, visibility of an object to be illuminated (the spread illuminating apparatus 10 such as a liquid crystal display) will be improved.

Although the present invention has been explained based on some preferable embodiments, these should not be regarded as limitation of the present invention. It is true that the light incident prism 30 can enjoy the maximum advantage if applied to the thin-type spread illuminating apparatus 10 with the light incident portion 26 as shown in FIG. 1. This is because it can inhibit the reversal phenomenon without increasing light leakage. However, the light incident prism 30 may be applied to any type of spread illuminating apparatus provided with a light guiding plate having a side end face as a light incident face.

The present invention has been introduced as that the light incident prism 30 is formed all on the light incident face 22. The light incident prism 30 is instead selectively formable at specific region(s) of the light incident face 22 such as region (s) directly facing the light emitting face 12 of the LED 11 of the light incident face 22. In addition, the second prism portion 32 of the light incident prism 30 may not necessarily include a plurality of second prisms 34, but may include only one second prism 34.

In addition, as to the first and second prisms 33 and 34 constituting the light incident prisms 30, their prism faces 33a, 33b, 34a and 34b are not limited to be plane (that is, their inclination angles are constant), but may be, for example, curved surfaces. Furthermore, as to the light incident prisms 30, the number of types of prism portions including prisms having different heights from the light incident face 22 is not necessarily limited to two, but the light incident prisms 30 may have three or more types of prism portions including prisms having different heights.

What is claimed is:

1. A spread illuminating apparatus comprising:
a point light source;
a light guiding plate having a light incident face on which the point light source is mounted, and a light output face for planarly outputting light that has been introduced from the light incident face, the light incident face having light incident prism thereon so as to diffuse light that has been emitted from the point light source into a planar space substantially parallel with the light output face,
wherein the light incident prism include: a first prism portion including a plurality of first prisms convex relative to the light incident face; and a second prism portion including a second prism convex relative to the light incident face, the second prism portion being placed next to the first prism portion in a longitudinal direction of the light incident face,
the first prism partially overlaps another first prism adjacent thereto, and
the vertex of each first prism is set higher than the vertex of the second prism relative to the light incident face.

2. The spread illuminating apparatus according to claim 1, further comprising a root formed by which each adjacent first prism overlaps to each other, the root being adapted to have a position higher than the vertex of the second prism relative to the light incident face.

3. The spread illuminating apparatus according to claim 1, wherein the first and second prism portions are repeatedly formable along the longitudinal direction of the light incident face.

4. The spread illuminating apparatus according to claim 1, wherein the first and second prisms are configurable to have a cross section constant in the thickness direction of the light guiding plate.

5. The spread illuminating apparatus according to claim 1, wherein the first and the second prisms are each configurable to have a triangular cross section.

6. The spread illuminating apparatus according to claim 1, wherein the first and the second prisms are all configurable to have the same vertical angles.

* * * * *